United States Patent
Prakash et al.

(10) Patent No.: US 9,292,683 B2
(45) Date of Patent: Mar. 22, 2016

(54) COMPUTING DEVICE SECURITY

(71) Applicant: INTEL CORPORATION, Santa Clara, CA (US)

(72) Inventors: Gyan Prakash, Beaverton, OR (US); Shahrokh Shahidzadeh, Beaverton, OR (US); Venkatesh Ramamurthy, Hillsboro, OR (US); Hong Li, El Dorado Hills, OR (US); Mohan J. Kumar, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 322 days.

(21) Appl. No.: 13/977,020

(22) PCT Filed: Mar. 15, 2013

(86) PCT No.: PCT/US2013/032569
§ 371 (c)(1),
(2) Date: Jun. 28, 2013

(87) PCT Pub. No.: WO2014/143047
PCT Pub. Date: Sep. 18, 2014

(65) Prior Publication Data
US 2014/0325638 A1    Oct. 30, 2014

(51) Int. Cl.
| | |
|---|---|
| *G06F 7/04* | (2006.01) |
| *G06F 12/00* | (2006.01) |
| *G06F 12/14* | (2006.01) |
| *G06F 13/00* | (2006.01) |
| *G06F 17/30* | (2006.01) |
| *G11C 7/00* | (2006.01) |
| *G06F 21/50* | (2013.01) |
| *G06F 21/30* | (2013.01) |
| *G06F 21/35* | (2013.01) |
| *G06F 21/74* | (2013.01) |
| *H04L 29/06* | (2006.01) |

(52) U.S. Cl.
CPC ............... *G06F 21/50* (2013.01); *G06F 21/30* (2013.01); *G06F 21/35* (2013.01); *G06F 21/74* (2013.01); *H04L 63/0492* (2013.01); *G06F 2221/2105* (2013.01); *H04L 63/08* (2013.01)

(58) Field of Classification Search
CPC ..................................................... G06F 21/35
USPC .............................................. 726/16; 705/50
See application file for complete search history.

(56) References Cited

U.S. PATENT DOCUMENTS 6,927,682 B1 * 8/2005 Touhey et al. ............. 340/457.4
7,607,014 B2   10/2009 Larson et al.
(Continued)

FOREIGN PATENT DOCUMENTS

| KR | 10-0813288 B1 | 3/2008 |
| KR | 10-2009-0001248 A | 1/2009 |
| KR | 10-2011-0101601 A | 9/2011 |

OTHER PUBLICATIONS

International Search Report and Written Opinion received for PCT Patent Application No. PCT/US2013/032569, mailed on Dec. 13, 2013, 12 pages.

*Primary Examiner* — Amir Mehrmanesh
*Assistant Examiner* — Khang Do
(74) *Attorney, Agent, or Firm* — International IP Law Group, P.L.L.C.

(57) ABSTRACT

Techniques for providing security for a computing device are described herein. In one example, a maintenance issue for the computing device is detected. Additionally, a maintenance credential proximate the computing device can be detected. Furthermore, an alarm system within the computing device can be disabled in response to detecting an authorized maintenance credential.

16 Claims, 4 Drawing Sheets

(56) References Cited

U.S. PATENT DOCUMENTS

| | | | |
|---|---|---|---|
| 2006/0054708 A1* | 3/2006 | Koo | G06K 7/0008 235/492 |
| 2007/0004381 A1* | 1/2007 | Larson et al. | 455/411 |
| 2007/0043944 A1* | 2/2007 | Okamoto | 713/168 |
| 2008/0283342 A1 | 11/2008 | Deplazes et al. | |
| 2010/0156591 A1* | 6/2010 | Newman et al. | 340/5.2 |
| 2010/0257585 A1* | 10/2010 | Bezilla et al. | 726/1 |
| 2013/0198813 A1* | 8/2013 | van Roermund et al. | 726/4 |

* cited by examiner

COMPUTING DEVICE SECURITY

BACKGROUND

1. Field

This disclosure relates generally to computing device security and more specifically, but not exclusively, to providing security during computing device maintenance.

2. Description

Data centers continue to grow in size as an increasing number of services are provided through cloud computing and other large scale networks. As a result, data centers include an increasing number of computing devices, such as servers, among others. At times, the computing devices in the data centers are physically accessed to provide maintenance such as hardware replacement, visual inspection of cables, and operating system installation.

BRIEF DESCRIPTION OF THE DRAWINGS

The following detailed description may be better understood by referencing the accompanying drawings, which contain specific examples of numerous features of the disclosed subject matter.

DESCRIPTION OF THE EMBODIMENTS

According to embodiments of the subject matter described herein, a computing device can include a security module that provides security during maintenance. In some embodiments, the security module can provide security during maintenance by activating an alarm system if an unauthorized individual performs the maintenance. For example, maintenance may be performed on a computing device for any suitable maintenance issue such as routine maintenance, replacing hardware components, replacing cables, or installing new components, among others. In one embodiment, a security module can detect maintenance credentials, which verify that an authorized user is performing the maintenance on a computing device. A maintenance credential, as referred to herein, can include any suitable credential that authenticates an authorized individual such as a password, authentication token, or radio-frequency identification tag, among others.

Reference in the specification to "one embodiment" or "an embodiment" of the disclosed subject matter means that a particular feature, structure, or characteristic described in connection with the embodiment is included in at least one embodiment of the disclosed subject matter. Thus, the phrase "in one embodiment" may appear in various places throughout the specification, but the phrase may not necessarily refer to the same embodiment.

Figure 1:
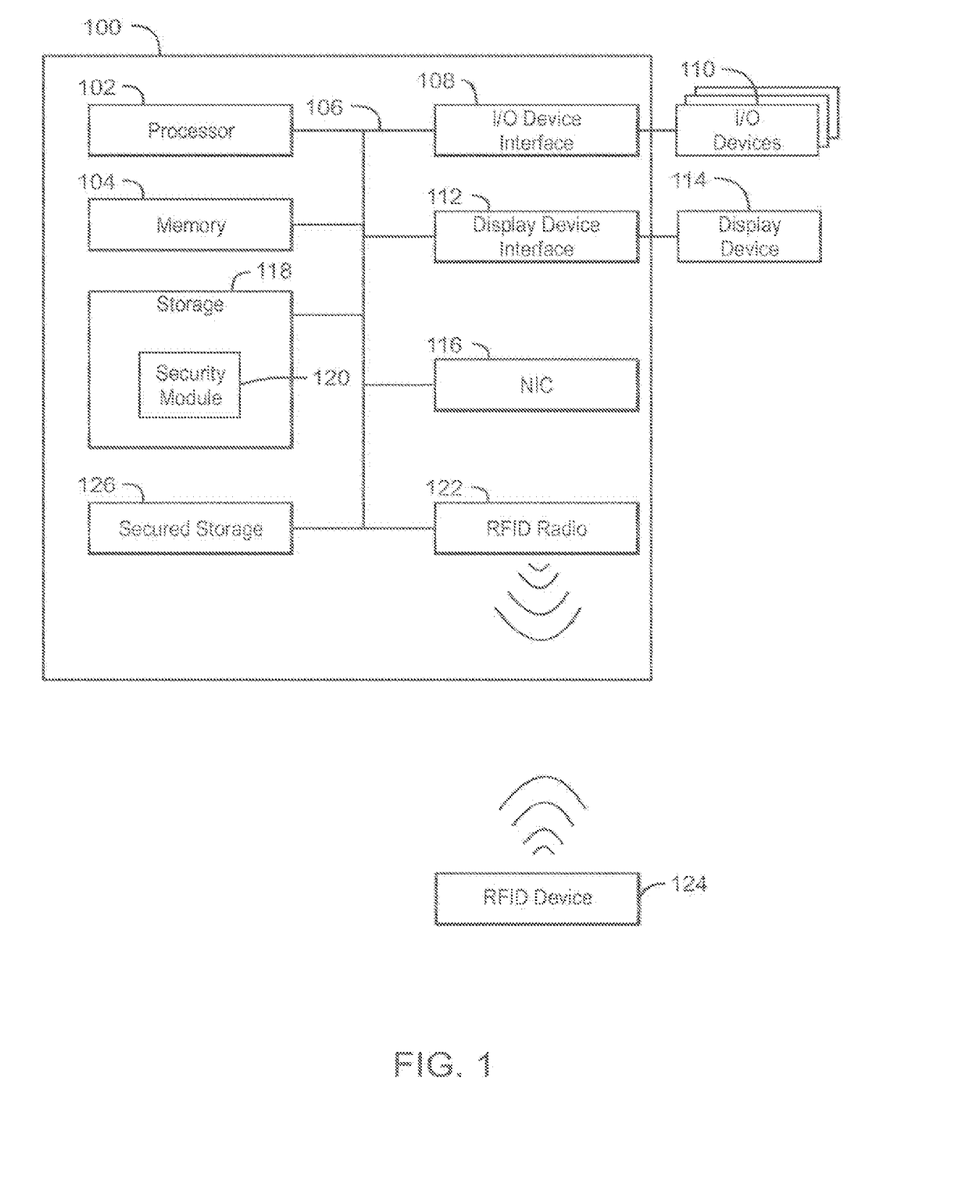
FIG. 1 is a block diagram of an example of a computing device that can provide security during maintenance on a computing system.

FIG. 1 is a block diagram of an example of a computing device that can provide security during maintenance on a computing system. The computing device 100 may be, for example, a mobile phone, laptop computer, desktop computer, or tablet computer, among others. The computing device 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory, read only memory, flash memory, or any other suitable memory systems. The instructions that are executed by the processor 102 may be used to implement a method that can provide security during maintenance on a computing system.

The processor 102 may be connected through a system interconnect 106 (e.g., PCI®, PCI-Express®, HyperTransport®, NuBus, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface card 116, also referred to herein as NIC, may be adapted to connect the computing device 100 through the system interconnect 106 to a network (not depicted). The network (not depicted) may be a wide area network (WAN), a local area network (LAN), or the Internet, among others.

The processor 102 may also be linked through the system interconnect 106 to a storage device 118, which can include a hard drive, an optical drive, a USB flash drive, an array of drives, or any combinations thereof. The storage device 118 may include a security module 120 that can provide security while maintenance is performed on the computing device 100. For example, the security module 120 can detect information received by a radio-frequency identification radio, also referred to herein as an RFID radio 122. In one embodiment, the RFID radio 122 can detect authentication data from an RFID device 124. Authentication data, as referred to herein, can include any suitable encryption key, encryption method, or authentication credentials, among others. For example, an RFID device 124 may transmit authentication data with a particular frequency which allows maintenance to be performed on the computing device 100. In some embodiments, the security module 120 can verify that the authentication data received from the RFID device 124 through the RFID radio 122 is correct by accessing secured storage 126. The secured storage 126 can store authentication data that, when detected, prompts the security module 120 to disable an alarm system. In some embodiments, the secured storage 126 includes non-volatile, read-only memory.

It is to be understood that the block diagram of FIG. 1 is not intended to indicate that the mobile device 100 is to include all of the components shown in FIG. 1. Rather, the computing device 100 can include fewer or additional components not illustrated in FIG. 1 (e.g., a board management controller, additional memory components, additional modules, additional network interfaces, etc.). Furthermore, any of the functionalities of the security module 120 may be partially, or entirely, implemented in hardware and/or in the processor 102. For example, the functionality may be implemented with an application specific integrated circuit, or in logic implemented in the processor 102, or in a board management controller, among others.

Figure 2:
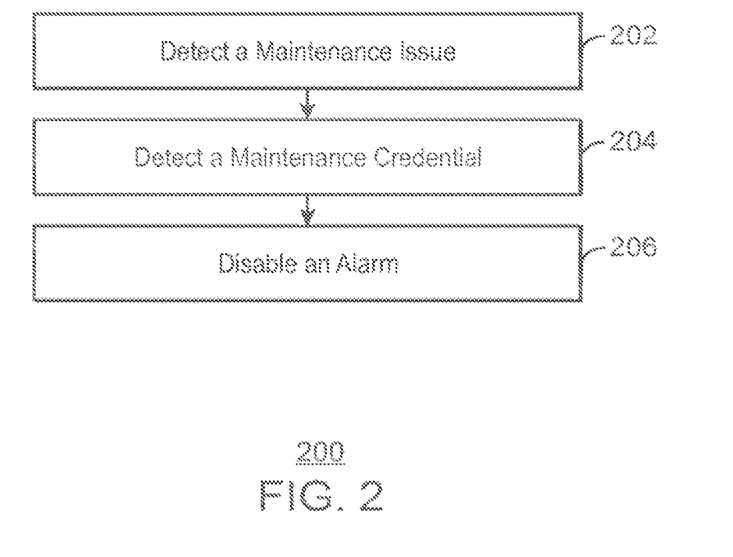
FIG. 2 is a process flow diagram illustrating an example of a method for providing security during maintenance on a computing system.

FIG. 2 is a process flow diagram illustrating an example of a method for providing security during maintenance on a computing system. The method 200 can be implemented with any suitable computing device, such as the computing device 100 of FIG. 1.

At block 202, the security module 120 can detect a maintenance issue for the computing device. As discussed above, a maintenance issue can include periodic maintenance such as repairing components, replacing cables or wires, or installing operating systems, among others. In some embodiments, the security module 120 may send an electronic notification, such as an email notification, among others, in response to a maintenance issue. For example, the security module 120 may detect that a hardware component is not functioning properly and the security module 120 may send a communication to another computing system or administrator that monitors the performance of the computing system.

At block 204, the security module 120 can detect a maintenance credential proximate the computing device. As discussed above, a maintenance credential can include any suitable credential that authenticates an authorized user such as a password, authentication data, or a radio-frequency identifier, among others. In some embodiments, the maintenance credential can be transmitted to the security module 120 from an RFID device through an RFID radio in the computing device. For example, a technician that is authorized to perform maintenance on the computing device may have an RFID device, such as a badge, that can emit authentication data to the security module 120. In some embodiments, the security module 120 can verify that the authentication data received from an RFID device is accurate by accessing a secured storage device in the computing device. The secured storage device can enable the security module 120 to retrieve stored authentication data such as encryption keys, among others. In one embodiment, the secured storage may be a read-only device. Therefore, in some examples, the secured storage device may allow one write operation containing authentication data to be performed on the secured storage device. The security module 120 may then read authentication data from the secured storage device any suitable number of times.

At block 206, the security module 120 can disable an alarm system within the computing device based on an authorized maintenance credential. In some embodiments, an alarm system can alert additional computing systems, or administrators, among others of unauthorized maintenance or access to a computing device. For example, an alarm system may include sending an email or any other suitable electronic communication to an administrator that indicates an unauthorized user has accessed a computing device. In one embodiment, disabling the alarm system can prevent the security module 120 from sending a communication regarding unauthorized access of a computing device. In some embodiments, the security module 120 can also provide power to lights, such as light-emitting diodes. In response to disabling the alarm system. In one example, the lights can indicate that the computing device is to receive maintenance.

The process flow diagram of FIG. 2 is not intended to indicate that the operations of the method 200 are to be executed in any particular order, or that all of the operations of the method 200 are to be included in every case. For example, the security module 120 may detect a maintenance credential proximate the computing device before detecting a maintenance issue.

Figure 3:
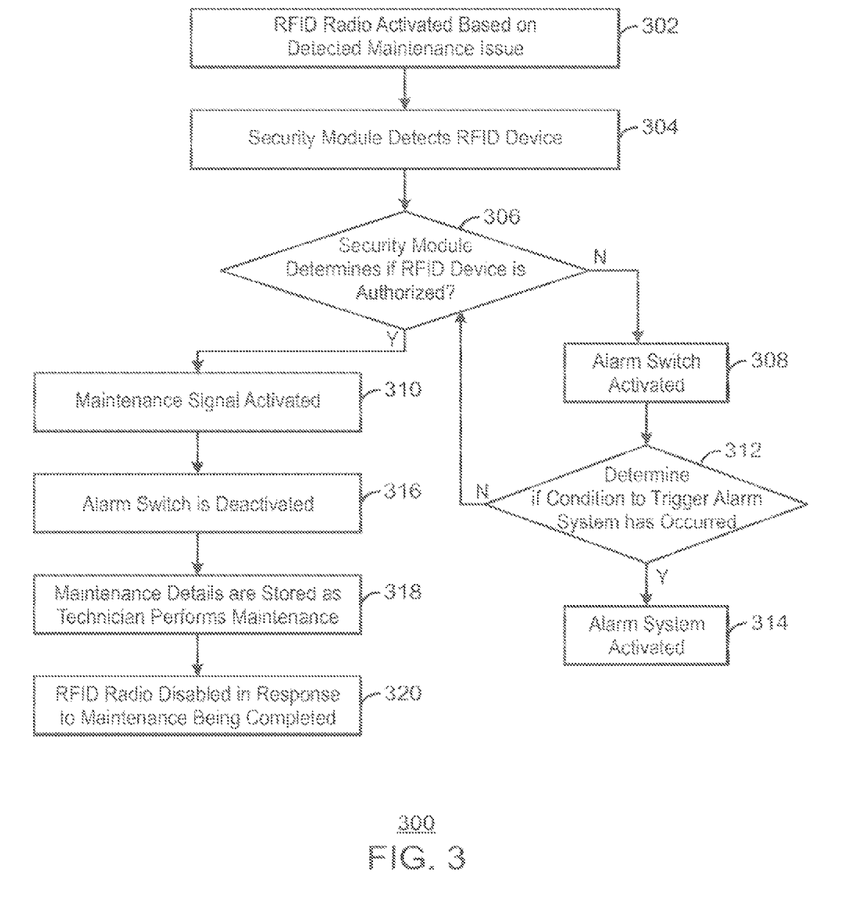
FIG. 3 is a process flow diagram illustrating an example of a method for operating a security alarm during maintenance on a computing system.

FIG. 3 is a process flow diagram illustrating an example of a method for operating a security alarm during maintenance on a computing system. The method 300 can be implemented with a computing system, such as the computing device 100 of FIG. 1.

At block 302, a security module 120 can activate an RFID radio after defecting a maintenance issue. As discussed above, a maintenance issue can include any suitable periodic maintenance on a computing device such as replacing components, or replacing cables, among others. In some embodiments, the RFID radio is activated in response to a technician entering a data center in which a computing device is stored. The RFID radio may also be activated according to a time scheduled for maintenance.

At block 304, a security module 120 detects an RFID device. An RFID device can include any device capable of emitting a radio frequency identifier. For example, an RFID device can include RFID badges, or mobile devices, among others. In some embodiments, the security module 120 may detect RFID devices within any suitable proximity of a computing device. For example, the security module 120 may detect RFID devices that are within a predetermined distance from the computing device.

At block 306, the security module 120 can determine if the RFID device includes authentication data that authorizes maintenance on a computing device. In some embodiments, the security module 120 can validate authentication data received from the RFID device. For example, the security module 120 can compare authentication data received from the RFID device to authentication data stored in secured memory in the computing device. Authentication data, as referred to herein, can include any suitable encryption key, encryption method, or authentication credentials, among others. In some examples, authentication data can be written once to the secured memory. The secured memory may not allow any additional writes to the secured memory, which can prevent modification to the stored authentication data. In some embodiments, the authentication data can include a technician personal identifier, a company identifier, and computing device identity information, among others. In one example, the computing device identity information can include any suitable alphanumeric string that identifies a computing device.

If the authentication data stored in the secured memory matches the authentication data received from the RFID device, the process flow continues at block 308. If the authentication data stored in the secured memory does not match the authentication data received from the RFID device, the process flow continues at block 310.

At block 308, the security module 120 can activate an alarm switch. In some embodiments, the alarm switch can include a general purpose input output pin that can trigger an alarm system in response to a condition such as a computing device losing power, among ethers. For example, if an unauthorized user removes the power from a computing system, an alarm system may be activated. In some embodiments, a computing device may include a second power source, such as a battery, that can provide power to the security module 120. In one embodiment, the alarm switch may also trigger an alarm system if a cover is removed from a computing device, if the computing device is removed from a rack of computing devices, or if any number of cables are detached from the computing device, among others.

At block 312, the security module 120 determines if a condition has occurred that triggers the alarm system. If a condition to activate the alarm system has not occurred, the process flow returns to block 306. If a condition to activate the alarm system has occurred, the process flow continues at block 314.

At block 314, the security module 120 can activate the alarm system. In some embodiments, the alarm system can include generating an audio alarm or a haptic alarm such as a vibration. In one embodiment, the security module 120 can also transmit an electronic communication to a separate computing device or an administrator, among others. For example, the security module 120 may send an electronic communication to an administrator that includes the time of unauthorized access of a computing system and any additional information such as the hardware components or software components that are modified.

If the security module determines that an RFID device is authorized at block 306, the process flow continues at block 310. At block 310, the security module 120 can activate a maintenance signal. A maintenance signal, as referred to herein, can include any suitable display that indicates to a technician that a computing device is to receive maintenance. For example, a maintenance signal may include providing power to a light source, such as a light-emitting diode. In some embodiments, the maintenance signal can indicate to a technician which computing device is to receive maintenance. The maintenance signal can assist the technician in locating the computing system to receive maintenance within a rack of computing systems.

At block 316, the security module 120 can deactivate the alarm switch. For example, the security module can prevent the alarm system from emitting an audio sound, or transmitting an electronic communication to another computing device, or administrator.

At block 318, the security module 120 can store a service repair log that includes maintenance details. In some embodiments, the security module 120 generates the service repair log as maintenance is performed on the computing device. The maintenance details, as referred to herein, can include the length of time to perform maintenance, the technician's personal identification, and the time of the maintenance, among others. In one embodiment, the maintenance details can also be transmitted to another computing device or an administrator, among others, after the maintenance is complete. The security module 120 can also store the order that maintenance is performed for the software and hardware components of a computing device.

At block 320, the security module 120 can disable the RFID radio in response to completed maintenance that resolves a maintenance issue. In some embodiments, disabling the RFID radio can provide additional security for the computing system because the computing system may not enable the RFID radio unless the computing system detects a maintenance issue. In one example, the alarm system may remain activated unless a maintenance issue is detected and an authorized maintenance credential is detected proximate the computing system.

The process flow diagram of FIG. 3 is not intended to indicate that the operations of the method 300 are to be executed in any particular order, or that all of the operations of the method 300 are to be included in every case. For example, the security module 120 may deactivate the alarm switch before activating the maintenance signal. Additionally, the security module 120 may also use the maintenance signal to indicate that maintenance is not performed according to a maintenance policy. For example, a maintenance policy stored in the computing device may indicate that software maintenance issues are to be repaired before hardware maintenance issues. In one embodiment, the security module 120 may notify the technician that the maintenance policy has been violated by emitting an audio signal, changing the color of lights that display the maintenance signal, or flashing the lights that display the maintenance signal, among ethers.

Figure 4:
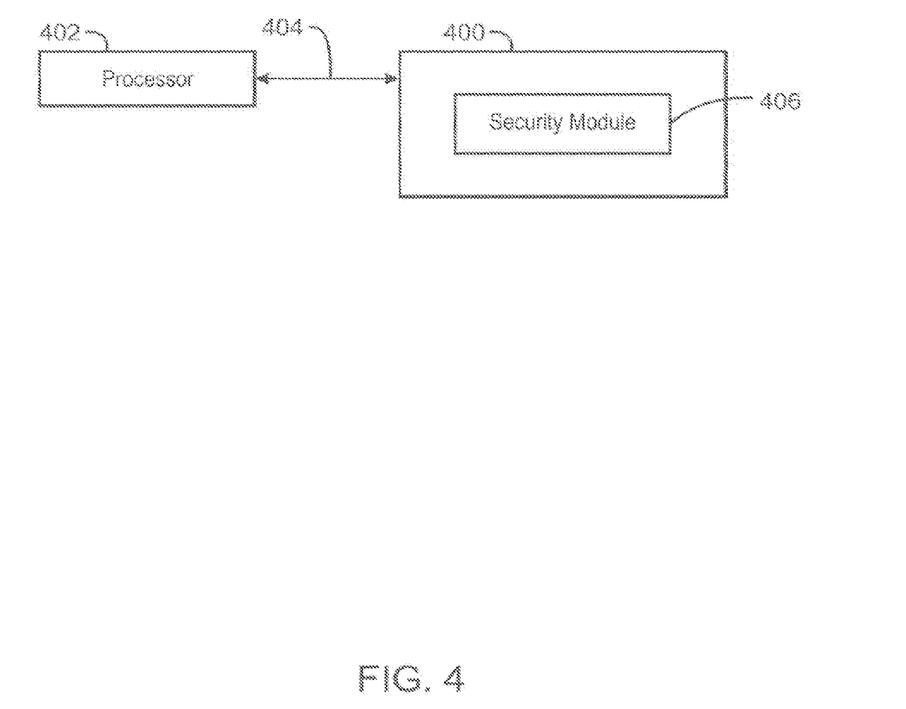
FIG. 4 is a block diagram depicting an example of a tangible, non-transitory computer-readable medium that can provide security during maintenance on a computing system.

FIG. 4 is a block diagram depicting an example of a tangible, non-transitory computer-readable medium that can provide security during maintenance on a computing system. The tangible, non-transitory, computer-readable medium 400 may be accessed by a processor 402 over a computer interconnect 404. Furthermore, the tangible, non-transitory, computer-readable medium 400 may include code to direct the processor 402 to perform the operations of the current method.

The various software components discussed herein may be stored on the tangible, non-transitory, computer-readable medium 400, as indicated in FIG. 4. For example, a security module 406 may be adapted to direct the processor 402 to provide security during maintenance on a computing system. It is to be understood that any number of additional software components not shown in FIG. 4 may be included within the tangible, non-transitory, computer-readable medium 400, depending on the specific application.

EXAMPLE 1

A method for providing security for a computing device is described herein. The method includes detecting a maintenance issue for the computing device. The method also includes detecting a maintenance credential proximate the computing device. Furthermore, the method includes disabling an alarm system within the computing device in response to detecting an authorized maintenance credential.

In some embodiments, detecting a maintenance credential proximate the computing device can include detecting a radio frequency identification device proximate the computing device, detecting the maintenance credential from the radio frequency identification device, and determining the maintenance credential authorizes maintenance to be performed on the computing device. In some examples, the maintenance credential is stored in a secured non-volatile, read-only memory in the computing device. In one embodiment, the method can include using a maintenance signal to indicate that a maintenance policy has been violated.

EXAMPLE 2

A computing device for providing security for a computing device is described herein. The computing device can include a radio-frequency identification radio to receive a maintenance credential, a processor to execute stored computer-readable instructions, and a storage device that stores computer-readable instructions. The computer-readable instructions, when executed by the processor, direct the processor to detect a maintenance issue for the computing device and detect the maintenance credential proximate the computing device. The computer-readable instructions, when executed by the processer, can also direct the processor to disable an alarm system within the computing device in response to detecting an authorized maintenance credential and deactivate the radio-frequency identification radio.

In some embodiments, the alarm system comprises sending an electronic notification to an administrator. In one example, the alarm system comprises emitting a sound indicative of unauthorized access to the computing device. Additionally, in one embodiment, the computing device can also include a secured non-volatile, read-only memory to store the maintenance credential and a light that indicates maintenance is to be performed on the computing device.

EXAMPLE 3

A non-transitory, computer-readable medium comprising a plurality of instructions for providing security for a computing device is described herein. The plurality of instructions, in response to being executed on a computing device, can cause the computing device to detect a maintenance issue for the computing device and detect the maintenance credential from a radio-frequency identification device proximate the computing device. The plurality of instructions, in response to being executed on a computing device, can also cause the computing device to disable an alarm system within the computing device in response to detecting an authorized maintenance credential. Furthermore, the plurality of instructions, in response to being executed on a computing device, can cause the computing device to deactivate a radio-frequency identification radio.

In some embodiments, the instructions cause the computing device to determine the maintenance issue is resolved, and deactivate the radio-frequency identification radio. In one example, the instructions can also cause the computing device to store a service repair log in response to detecting the authorized maintenance credential proximate the computing device.

EXAMPLE 4

An apparatus for providing security for a computing device is described herein. The apparatus includes means for detecting a maintenance issue for the computing device and means for detecting the maintenance credential from a radio-frequency identification device proximate the computing device. The apparatus also includes means for disabling an alarm system within the computing device in response to detecting an authorized maintenance credential. Furthermore, the apparatus includes means for deactivating a radio-frequency identification radio.

In some embodiments, the apparatus includes means for determining the maintenance issue is resolved, and means for deactivating the radio-frequency identification radio. In one example, the apparatus includes means for storing a service repair log in response to detecting the authorized maintenance credential proximate the computing device.

Although an example embodiment of the disclosed subject matter is described with reference to block and flow diagrams in FIGS. 1-4, persons of ordinary skill in the art will readily appreciate that many other methods of implementing the disclosed subject matter may alternatively be used. For example, the order of execution of the blocks in flow diagrams may be changed, and/or some of the blocks in block/flew diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common on the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as wall as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A method for providing security for a computing device comprising:
    detecting a maintenance issue for the computing device;
    detecting a radio frequency identification device proximate the computing device;
    detecting a maintenance credential proximate the computing device from the radio frequency identification device;
    determining the maintenance credential authorizes maintenance to be performed on the computing device;
    disabling an alarm system within the computing device in response to detecting an authorized maintenance credential proximate the computing device; and
    deactivating a radio-frequency identification radio in the computing device in response to determining the maintenance issue is resolved.

2. The method of claim 1, wherein the alarm system comprises sending an electronic notification to an administrator.

3. The method of claim 1, wherein the alarm system comprises emitting a sound indicative of unauthorized access to the computing device.

4. The method of claim 1, comprising storing a service repair log in response to detecting the authorized maintenance credential proximate the computing device.

5. The method of claim 1, wherein the maintenance credential is stored in a secured non-volatile, read-only memory in the computing device.

6. The method of claim 1, comprising displaying a light that indicates maintenance is to be performed on the computing device.

7. The method of claim 1, comprising using a maintenance signal to indicate that a maintenance policy has been violated.

8. A computing device for providing security for a computing device comprising:
    a radio-frequency identification radio to receive a maintenance credential;
    a processor to execute stored computer-readable instructions; and
    a storage device that stores computer-readable instructions that, when executed by the processor, direct the processor to:
    detect a maintenance issue for the computing device;
    detect a radio frequency identification device proximate the computing device;
    detect the maintenance credential proximate the computing device from the radio frequency identification device;
    determine the maintenance credential authorizes maintenance to be performed on the computing device;
    disable an alarm system within the computing device in response to detecting an authorized maintenance credential proximate the computing device; and
    deactivate the radio-frequency identification radio in response to determining the maintenance issue is resolved.

9. The computing device of claim 8, wherein the alarm system comprises sending an electronic notification to an administrator.

10. The computing device of claim 8, wherein the alarm system comprises emitting a sound indicative of unauthorized access to the computing device.

11. The computing device of claim 8, wherein the computer-readable instructions direct the processor to store a service repair log in response to detecting the authorized maintenance credential proximate the computing device.

12. The computing device of claim 8, comprising a secured non-volatile, read-only memory to store the maintenance credential.

13. The computing device of claim 8, comprising a light that indicates maintenance is to be performed on the computing device.

14. A non-transitory, computer-readable medium comprising a plurality of instructions that, in response to being executed on a computing device, cause the computing device to:
    detect a maintenance issue for the computing device;
    detect a radio frequency identification device proximate the computing device;
    detect the maintenance credential from the radio-frequency identification device proximate the computing device;
    determine the maintenance credential authorizes maintenance to be performed on the computing device;
    disable an alarm system within the computing device in response to detecting an authorized maintenance credential proximate the computing device; and
    deactivate a radio-frequency identification radio in response to determining the maintenance issue is resolved.

15. The non-transitory machine readable medium of claim 14, wherein the alarm system comprises sending an electronic notification to an administrator.

16. The non-transitory machine readable medium of claim 14, wherein the instructions cause the computing device to store a service repair log in response to detecting the authorized maintenance credential proximate the computing device.

* * * * *